July 12, 1949.  G. S. HOUGHLAND  2,476,095
FRACTIONATING APPARATUS

Filed June 5, 1944  2 Sheets-Sheet 1

INVENTOR
GLEN S. HOUGHLAND
BY Virgil F. Davies
William Klabunde
ATTORNEYS

July 12, 1949. G. S. HOUGHLAND 2,476,095
FRACTIONATING APPARATUS
Filed June 5, 1944 2 Sheets-Sheet 2

INVENTOR
GLEN S. HOUGHLAND
BY Virgil F. Davis
William Klabunde
ATTORNEYS

Patented July 12, 1949

2,476,095

UNITED STATES PATENT OFFICE 2,476,095

FRACTIONATING APPARATUS

Glen S. Houghland, Huntington, N. Y., assignor to The M. W. Kellogg Company, New York, N. Y., a corporation of Delaware Application June 5, 1944, Serial No. 538,850

9 Claims. (Cl. 261—114)

This invention relates to improvements in fractionating apparatus, and particularly to an improved baffle and bubble tray assembly.

In the art of fractional distillation, it is the usual practice to provide a series of bubble trays arranged in a vertical column one above the other through which upwardly rising vapors are passed in contact with downwardly flowing liquid. A down-flow conduit in the bottom of each tray permits the overflow of reflux liquid from one tray to be deposited on the below-adjacent tray, and means is provided on each tray to maintain a predetermined liquid level. Vertical risers in the bottom of each tray form passages for the rising vapors, and bubble caps over the risers, having their lower edges below the liquid level of the tray, cause the vapors to be counter-currently contacted by the descending liquid. The number of trays, and the arrangement and design of the risers, bubble caps, downcomers, and weirs are likely to vary, dependent upon the characteristics of the given liquid or other fluid undergoing fractionation and the degree of fractionation desired.

It is a well known peculiarity of conventional bubble trays that the vapor issuing from the bubble caps causes splashing of liquid and the projection of liquid droplets to a considerable height above the normal liquid level. Some of these droplets are carried as entrainment by the vapor leaving the tray into the tray immediately above. The amount of such entrainment increases as the vapor velocity is increased, and also as the depth of liquid above the cap slots is increased. The entrainment of liquid from one tray to the tray above also increases, other things being equal, as the vertical spacing between trays is decreased.

Liquid entrainment from one tray to another reduces fractionating efficiency and tower capacity. It is desirable to use as high a vapor velocity as is consistent with tower capacity and with keeping entrainment within a reasonable amount, in order to permit the use of a small diameter tower. It is also desirable in some applications to use a tray spacing as short as possible in order to permit the use of a short tower.

In a conventional bubble tray tower, there are fairly definite limits of maximum allowable velocities and minimum allowable tray spacings consistent with operation without excessive entrainment and consequent reduction of efficiency and capacity. This is well known in the art, and there have been proposed from time to time various devices, such as baffles or splash arresters, for separating liquid entrainment from vapor between the trays and causing it to drop back on the tray. A principal disadvantage in the various types of splash arresting and de-entraining devices that have been proposed is that, by reason of their bulk, they are not suitable for installation in columns where there is close vertical spacing between the bubble trays.

A principal object of my invention, therefore, is to provide an improved bubble tray of light and compact design, suitable for handling high vapor velocities with a minimum of liquid entrainment in the vapors passing through the risers. Compactness is especially desirable in those fractionating columns which employ a large number of bubble trays, as where separation of close boiling components is to take place; and lightness is particularly advantageous in the construction of portable fractionating towers.

Another object of my invention is to provide a baffle structure especially adapted for installation between compactly arranged bubble trays and capable of effecting a maximum of liquid de-entrainment in a minimum of vertical rise.

A further object is to provide a baffle structure of closely nested members for successively deflecting the rising liquid-entrained vapors to create a tortuous vapor path, and for presenting successive impingement and coalescing surfaces for liquid de-entrainment.

Another object of my invention is to provide a unitary baffle structure, removable as a whole, having closely-nested overhanging de-entrainment members arranged to engage substantially all the rising liquid particles and direct the same through devious upward paths with a minimum of horizontal movement across the tray.

Further objects and advantages of my invention will be apparent from the following description and claims taken in connection with the accompanying drawings forming a part of this application, in which:

Figure 1:
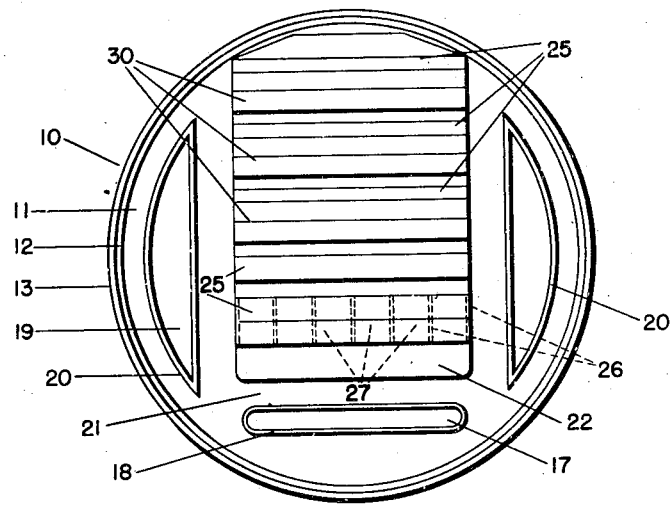
Fig. 1 is a plan view, in section, of a fractionating column embodying a type of baffle structure which, in accordance with my invention, is adapted for use with elongated bubble caps.
Figure 2:
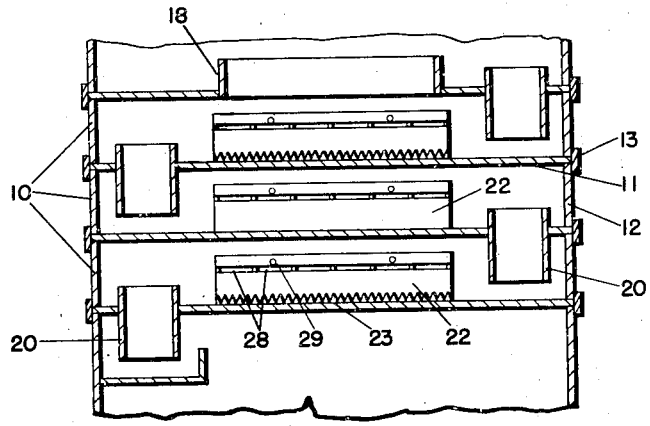
Fig. 2 is a fragmentary view of Fig. 1, in elevation, showing a typical tray arrangement.

Referring to Figs. 1 and 2 of the drawing, the fractionating column is shown as comprising a series of vertically stacked bubble-tray sections 10 partially nested one within the other and suitably joined in fluid-tight relation, as by welding, soldering, or brazing, to form a rigid structure.

Two forms of construction are illustrated for the bubble trays. In Fig. 2, the trays are shown as formed from separate bottom, side wall, and connecter sections, indicated respectively by the numerals 11, 12, and 13. The connector ring 13 is joined in fluid-tight connection to the outside of the side wall section 12 along its upper edge. Sufficient overhang of the connecter ring beyond the rim of the side wall is provided to receive in close fit the bottom of the above-adjacent tray. The desired number of trays are fitted together and the overlapping joints are sealed, as by welding, soldering, or brazing.

Figure 4:
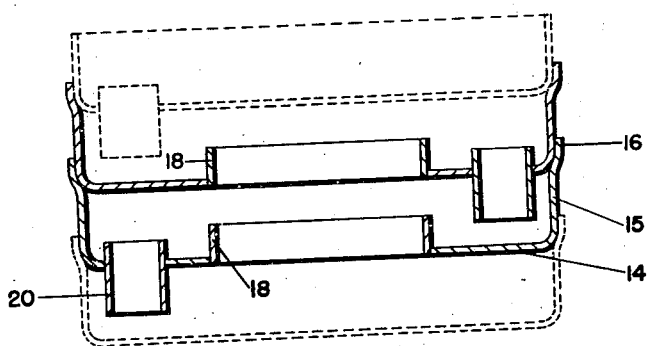
Fig. 4 is an enlarged view, in elevation, showing a modified bubble tray design especially suitable for stacking to form a compact, light-weight column.

A modified construction for the bubble tray, especially practical where comparatively small, light-weight column is desired, is shown in Fig. 4. Where the contemplated column design is such that sheet metal construction throughout will provide sufficient rigidity, I propose to form the bubble tray from a single piece of sheet metal having suitable erosion and corrosion characteristics. The sheet metal piece 14 is turned up around the edges to form an upright cylindrical side wall 15. For a limited distance down from the upper rim, the side wall 15 is radially expanded, as at 16, to receive in close fit the bottom of the tray above. The overlap formed by portion 16 is joined to the tray above, as by welding, soldering, or brazing, to form a rigid fluid-tight structure.

Referring again to Figs. 1 and 2, each bubble tray 10 is provided with the conventional risers and bubble caps for conducting the vapors upwardly in contact with a reflux liquid on the tray, and the usual downcomer for conducting overflow liquid from one tray to the surface of the tray below.

As clearly shown in Fig. 1, a row of parallel, elongated vapor slots 17 extends across the center of the tray bottom 11, in which are set vertical oblong risers 18, having rounded ends. Although I have chosen elongated risers to illustrate the invention, it will hereinafter be shown that the invention is not so limited.

To one side of the row of risers 18, the tray is cut out, as at 19, to receive a segmental overflow conduit or downcomer 20, the chord side of which extends across the mouths of all the channels 21 formed between the spaced risers 18. The downcomer 20 extends above the surface of the tray to provide a dam for the reflux liquid thereon, the distance of the rim above the tray surface determining the depth of the pool of liquid. The dam is shown as being lower than the heighth of the risers 18, so that liquid may not spill over the latter. Each downcomer 20 extends below the bottom of the tray a distance sufficient to place its outlet below the surface of the liquid pool on the tray beneath. As the reflux liquid is discharged upon the tray from the downcomer of the tray above, it spreads across the inlet side of the tray surface and travels as a sheet of moving liquid through the various channels 21 to the outlet side of the tray, where it spills over the dam.

Figure 3:
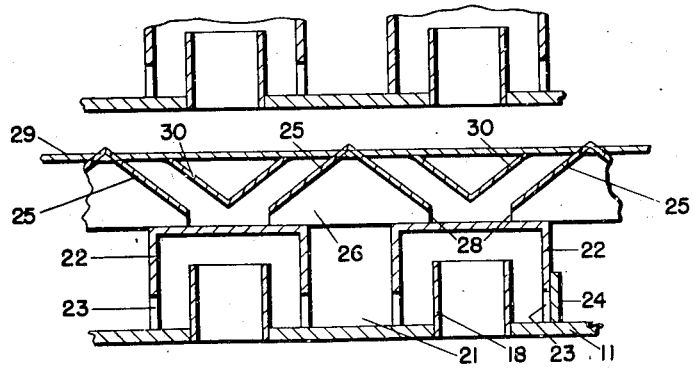
Fig. 3 is an enlarged fragmentary view of the bubble trays illustrated in Figs. 1 and 2, in which the baffle structure is shown in section.

Covering each of the risers 18 is an oblong bubble cap 22 having notches 23 extending along the lower edge of one or both of the long sides, as clearly shown in the enlarged view of Fig. 3. It is contemplated that, dependent upon the characteristics of the liquid and the vapor streams, it may be advisable to discharge into the channels 21 from only one of the two bubble cap walls therein, in which case caps specially designed to effect such discharge may be employed, or the regular caps may be blocked off along all or part of one side, as by a metal strip 24 attached along the lower edge of the bubble cap, shown on one of the caps in Fig. 3.

In the conventional manner, the vapors are caused to pass upward through the risers 18, and are deflected downward by the bubble caps 22 to discharge from the notches 23 along the lower edges thereof into the pool of liquid on the tray. The vapors bubbling upwardly through and emerging from the liquid pool carry with them entrained liquid particles. If there were no baffles, substantial quantities of these liquid particles would be projected vertically upward to a considerable height above the normal liquid level, the amount of droplets and the height of projection depending upon the vapor velocity and the height of the normal liquid level above the top of the slots in the caps. When the tray spacing is close, and when the baffles are not used, a considerable amount of liquid droplets may be carried by the vapor from each tray into the tray immediately above, seriously reducing the fractionating efficiency and the capacity of the tower. To precipitate such liquid particles out of the vapor stream, without impairing the efficiency of liquid-vapor contact, baffles are provided, the construction of which in one of its preferred forms is clearly shown in Figs. 1, 2, and 3.

The baffle structure comprises a plurality of angle members 25 each disposed horizontally above one of the channels 21 and extending longitudinally therealong coextensive with the bubble caps 22. The angle members are positioned with the vertex uppermost and the sides sloping downwardly and outwardly. Each angle member has transverse vertical plate members 26 closing the ends thereof and partitioning off the intermediate space into equal compartments 27. Plate members 26 have straight horizontal lower edges terminating sufficiently below the sloping sides of the angle members so that vapors which are trapped under the baffle may not travel longitudinally thereunder to discharge at either end, but must, instead, discharge from the sides of each compartment of the baffle.

The angle members 25 are wider than the spaces between bubble caps, so that the lower edges of the sloping sides overhang the edges of the caps. The baffles rest upon the upper surface of the bubble caps, although, if desired, they may be supported above the caps. The lower extended portions of the vertical plates 26 support the right angle members in raised position above the caps to provide narrow longitudinal spaces 28 between the bubble caps and the edges of the angle members through which vapors escaping from beneath the angle member may pass.

Metal rods 29, projecting through holes formed in the sides of angle members 25 adjacent the vertex or ridge, unite the angle members into a rigid structure. The rods are secured to the angle members, and the ends of the rods terminate in contact with the side walls 12 in order to prevent relative lateral displacement of the entire baffle structure with respect to the tray, and of the angle member with respect to the channel. The ends of rods 29 are welded, or otherwise suitably joined, to the side walls of the bubble tray.

In the spaces between the angle members 25 are placed a second series of angle members 30. Angle members 30 are centrally positioned over the bubble caps 22 and extend parallel to and coextensive with the members 25. The vertex of angle members 30 is lowermost, and the sides slope upwardly and outwardly until they overhang the edges of the angle members 25. For support in their proper position, the members 30 are welded at points along their upper edges to the rods 29. The spaces between the sloping sides of angle members 25 and 30 form channels for the continued passage of the vapors escaping from the compartments 27 of the first baffles. It will be noted that the baffles are so arranged that all vapors and liquids rising upward from the channels 21 must be deflected by the first series of baffles, and all vapors or liquid-entrained vapors rising out from under the first series of baffles must be deflected by the second series of baffles. In this way, considerable baffle surface is presented for contact with the vapors, and substantially all the heavier liquid particles are precipitated back into the channels 21, or upon the surface of the bubble caps where they may eventually find their way back into the channels to again become part of the liquid pool.

Figure 5:
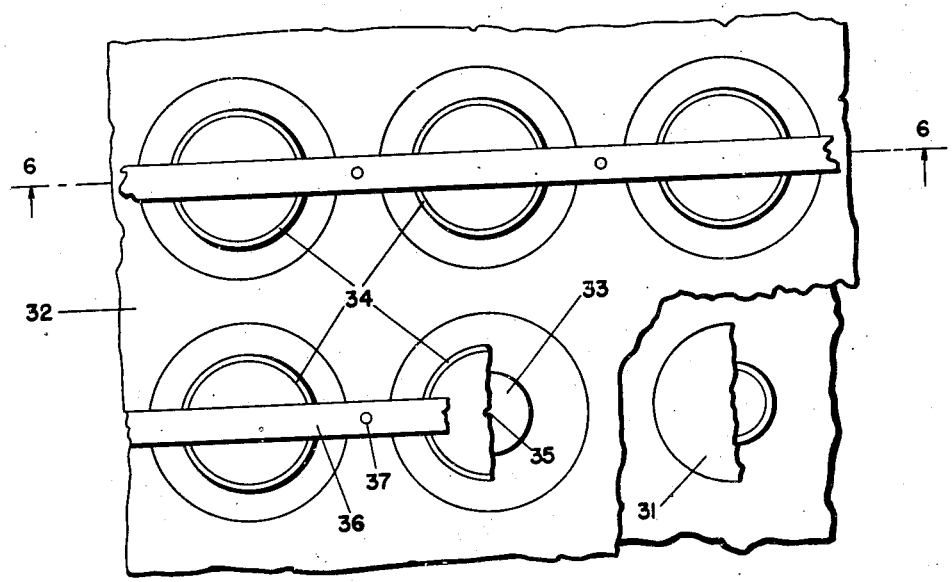
Fig. 5 is a fragmentary plan view of a modified baffle design suitable for use with circular bubble caps.
Figure 6:
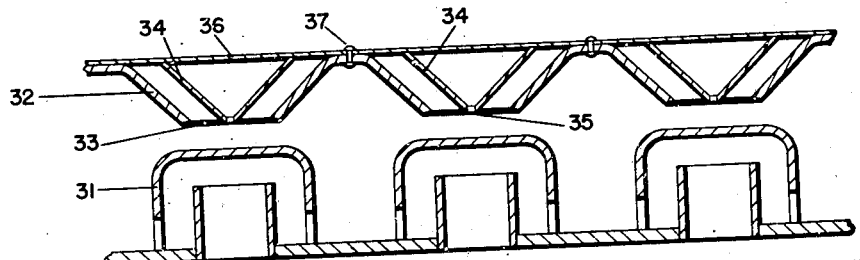
Fig. 6 is a section view of Fig. 5, taken along the line 6—6.

Figs. 5 and 6 show a modified baffle structure which is especially adapted for use in a bubble tray having risers and bubble caps of substantially equal length and breadth, such as the circular ones indicated by numeral 31. A plate member 32 is provided as a primary splash arrester supported immediately above the bubble caps. Plate member 32 has a series of perforations 33 arranged in a pattern identical with the pattern of the bubble caps, so that when the plate is suspended over the tray the openings will fall directly over the caps. The areas about the edges of openings 32 are turned downward, as shown in the section view of Fig. 6, and the openings are of smaller diameter than the bubble caps.

Suspended in inverted position within each of the openings is a conical member 34, the sides of which are preferably, although not necessarily, parallel to the turned-down area of the plate member 32. An opening 35 is provided at the ottom of conical member 34 to permit drainage of liquid collecting therein through the open top. The conical members 34 are attached at diametrically opposite points on the upper rim to the underside of metal strips 36 extending over the centers of each row of openings 33 and attached to the surface of plate member 32 by rivets 37.

With the novel arrangement described and shown, it is apparent that I have provided a bubble tray and baffle especially adapted for use in a compact fractionating column having numerous tray sections, and suitable for efficient use with a high velocity vapor stream. Despite the close tray spacing, liquid entrainment in the rising vapors is maintained at a minimum.

While I have shown my invention in but two forms, it will be obvious to those skilled in the art that it is not so limited, but is susceptible to various other changes and modifications without departing from the spirit or essential attributes of the invention, and therefore I do not desire to be limited to the specific details shown and described.

I claim:

1. In a bubble tray including parallel elongated risers and bubble caps covering the same, a baffle for de-entrainment of liquid in the rising vapors comprising a plurality of elongated downsloping angle members extending horizontally over the channels formed between said bubble caps and having their sides partially overhanging the sides of said caps, said downsloping angle members having end walls extending below the side edges, a plurality of upsloping angle members coextensive with said downsloping angle members and nested therebetween with their sides partially overhanging the sides of said downsloping members, and tie-rods extending transversely across all said angle members and uniting the same into a unitary structure.

2. In a bubble tray including parallel elongated risers and bubble caps covering the same, a baffle for de-entrainment of liquid in the rising vapors comprising a plurality of elongated downsloping angle members extending horizontally over the channels formed between said bubble caps and having their sides partially overhanging the sides of said caps, said downsloping angle members having end walls and intermediate partitions extending below the side edges, a plurality of upsloping angle members coextensive with said downsloping angle members and nested therebetween with their sides partially overhanging the sides of said downsloping members, and tie-rods extending transversely across all said angle members and uniting the same into a unitary structure.

3. A baffle for a fractionating bubble tray having risers and elongated bubble caps covering the same comprising members disposed above the spaces between said bubble caps to de-entrain the major portion of the liquid carried by the upwardly rising vapors, said members overhanging the edges of said caps and being shaped to slope downwardly and outwardly from the center toward the edges, and second members disposed above said bubble caps for further de-entrainment of liquid, said second members overhanging the edges of said first members and being shaped to slope upwardly and outwardly from the center toward the edges.

4. A baffle for a fractionating bubble tray having risers and bubble caps of substantially equal length and breadth comprising a perforate plate member supported above the tray and covering the bubble cap area, each of said bubble caps underlying one of said perforations, the areas about the edges of said perforations being turned down to provide sloping surfaces the lower edges of which overhang the edges of said caps, conical members disposed apex downward in nested relation within said perforations, the upper edges of said conical members overhanging the lower edges of said turned down areas, and metal strips passing centrally over each perforation and secured to said plate member, said strips supporting said conical members from their upper edges centrally within said perforations.

5. A baffle for a fractionating bubble tray having risers and elongated bubble caps covering the same comprising members disposed above the spaces between said bubble caps to de-entrain the major portion of the liquid carried by the upwardly rising vapors, said members overhanging the edges of said caps and being shaped to slope downwardly and outwardly from the center toward the edges and second members disposed above said bubble caps for further de-entrainment of liquid, said second members overhanging the edges of said first members and being shaped to slope upwardly and outwardly from the center toward the edges, the upper edges of said first members determining the maximum height of said baffle.

6. In a bubble tray including a plurality of risers for conducting vapors upwardly through each tray, and bubble caps over said risers, a baffle structure comprising members disposed above the channels formed between said bubble caps and having their edges overhanging said caps, said baffle members sloping downwardly and outwardly from the center toward said edges, and second baffle members disposed over the spaces between the first baffle members and overhanging the edges thereof, said second baffle members sloping outwardly and upwardly from the center and being disposed in nested relation between said first baffle members.

7. In a bubble tray including a plurality of risers for conducting vapors upwardly through said tray, and bubble caps over said risers, baffle structure comprising a perforate baffle plate supported above the tray and covering the bubble cap area, said perforations being smaller than, and disposed directly over, the tops of said bubble caps, the portions of said perforate baffle plate intermediate the openings sloping downward from the center toward the nearest bubble cap, a second baffle having portions spaced above and covering the openings in said perforate baffle plate, said portions of said second baffle sloping outwardly and upwardly from the center of said openings and partially overhanging the edges of said first baffle.

8. A baffle for a fractionating bubble tray having a plurality of parallel elongated risers in the bottom of said tray, and elongated bubble caps covering said risers, a baffle structure comprising a plurality of elongated downsloping angle members extending horizontally over the channels formed between said bubble caps with their sides overhanging the sides of said caps, said downsloping angle members having end walls and intermediate partitions extending below the lower edges of the sloping sides, a plurality of upsloping angle members co-extensive with said downsloping angle members and nested therebetween with their sides partially overhanging the lower edges of said downsloping members, and means extending transversely across said angle members uniting the same into a unitary baffle structure, said baffle unit being set upon the tops of said bubble caps.

9. In a bubble tray having a plurality of risers and bubble caps covering the same, a primary baffle member extending over the entire bubble area of the tray and having sloped under-surface areas arranged to provide between their lower edges a series of openings centrally above and substantially inward from the sides of said bubble caps, said primary baffle member intercepting substantially all the liquid-entrained vapors rising directly upward from the spaces on the bubble tray between said bubble caps and causing the liquid condensate to drop back upon the tray while the intercepted vapors are deflected to form a vapor stream travelling upward through said openings, and secondary sloped baffle members supported by said primary baffle member and disposed centrally of said opening in nested relationship with respect to said sloped under-surface areas, said secondary sloped members being arranged to intercept for further liquid-deentrainment all the vapor and liquid rising directly upward through said openings.

GLEN S. HOUGHLAND.

REFERENCES CITED

The following references are of record in the file of this patent:

UNITED STATES PATENTS

| Number | Name | Date |
|---|---|---|
| 722,272 | Baker | Mar. 10, 1903 |
| 1,743,131 | Grace | Jan. 14, 1930 |
| 1,748,595 | Chillas | Feb. 25, 1930 |
| 1,873,771 | Levin | Aug. 23, 1932 |

FOREIGN PATENTS

| Number | Country | Date |
|---|---|---|
| 506,405 | Great Britain | May 26, 1939 |
| 523,761 | Great Britain | July 22, 1940 |